United States Patent

[11] 3,610,290

| [72] | Inventors | Ray B. Anderson<br>Attleboro;<br>Charles D. Turk, Norwood, both of Mass. |
|---|---|---|
| [21] | Appl. No. | 769,662 |
| [22] | Filed | Oct. 22, 1968 |
| [45] | Patented | Oct. 5, 1971 |
| [73] | Assignee | Texas Instruments Incorporated<br>Dallas, Tex. |

[54] METAL LAMINATES AND TUBING EMBODYING SUCH LAMINATES
15 Claims, 8 Drawing Figs.

[52] U.S. Cl. ..................................................... 138/143,
29/196.6
[51] Int. Cl. ...................................................... F16l 9/14
[50] Field of Search ............................................. 138/143;
29/180, 196.6, 182.2, 194, 196

[56] References Cited
UNITED STATES PATENTS

| 930,927 | 8/1909 | Berkstresser ................ | 138/143 X |
| 1,460,049 | 6/1923 | Ballantine .................... | 138/143 |
| 2,060,034 | 11/1936 | Chandler ...................... | 138/143 |
| 2,544,335 | 3/1951 | Linnert ........................ | 29/196.6 X |

Primary Examiner—Louis K. Rimrodt
Attorneys—Harold Levine, Edward J. Connors, Jr., John A. Haug and James P. McAndrews ABSTRACT: Novel and improved metal laminates characterized by low cost, good brazability, and easy formability preferably comparable to low carbon steel, and by high strength and desirable corrosion resistance properties are shown to comprise one or more thin inner layers of corrosion-resistant material of selected tensile strength, yield strength, elongation, and work-hardening properties sandwiched between and metallurgically bonded to relatively thicker outer layers of other less corrosion-resistant metals which are characterized by a relatively lower tensile and yield strengths and by a work-hardening rate at least as low as the metal of the inner layers. Other such laminates having additional outer claddings of solder or brazing materials metallurgically bonded thereto are also shown. In addition, novel and improved tubings are shown which embody such easily formed, corrosion-resistant laminates.

PATENTED OCT 5 1971 3,610,290
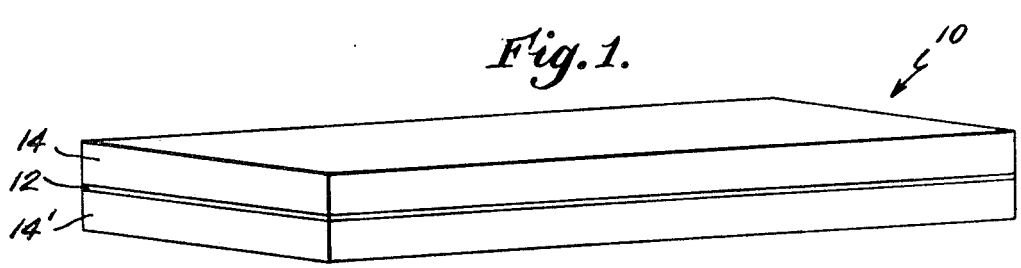
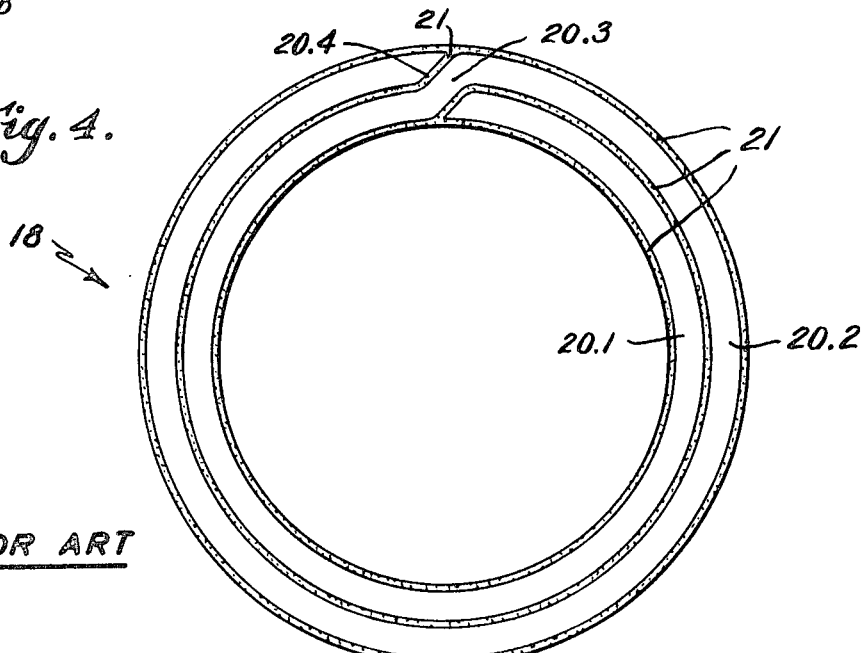
PRIOR ART
INVENTORS.
RAY B. ANDERSON
CHARLES D. TURK
BY
James P. M. Andrews
Att'y.

INVENTORS
RAY B. ANDERSON
CHARLES D. TURK
BY
James P. M. Anderson
Att'y.

INVENTORS.
RAY B. ANDERSON
CHARLES D. TURK

METAL LAMINATES AND TUBING EMBODYING SUCH LAMINATES

In manufacturing metal products which are widely used in significant quantities, the metals selected for use in the products are carefully chosen to meet formability, strength and corrosion-resistance standards and the like which are consistent with suitable cost levels. The industry manufacturing such products then tends to develop complex and expensive, and sometimes automated, facilities for manufacturing the products in an economical manner. Thereafter, when the price structure for such products has been established and when the industry has made its large investment in facilities to manufacture the products, considerable difficulty is experienced in converting to the manufacture of stronger or more corrosion-resistant products of a similar type. That is, the stronger and more corrosion-resistant metals are usually more expensive and are frequently more difficult to form so that they cannot be conveniently manufactured with facilities existing in the industry. These factors of price and industry investment in facilities cooperate to retard the development and manufacture of stronger and more corrosion-resistant products. For example, most automotive brake tubings are manufactured from mild steels in brazed double-wall constructions and the brake tubing industry has made a substantial investment in plant and equipment to permit the rapid and economical manufacture of tubing from such materials. While many stronger and more corrosion-resistant materials are available for use in such tubing, the relative cost of such materials, and frequently the inability to manufacture tubing from such materials with existing equipment, have hampered industry conversion to the manufacture of such improved tubings.

It is an object of this invention to provide a novel and improved metal laminate; to provide such a laminate which is characterized by low cost, increased strength, easy formability and improved resistance to corrosion; to provide such a laminate which is easily utilized in forming brazed tubing of single or double-wall construction; to provide such laminates which can be formed into automotive brake tubings using facilities already existing in the brake tubing industry; to provide brake tubings which are characterized by substantially increased strength and resistance to corrosion; and to provide such tubings which are of economical construction.

Briefly described, a novel and improved metal laminate of this invention embodies a thin inner layer of metal such as stainless steel of selected tensile strength, yield strength, malleability, ductility and work-hardening properties which is also characterized by relatively high corrosion-resistance properties. This thin inner layer of corrosion-resistant material is sandwiched between and metallurgically bonded to outer layers of other metals such as low-carbon steel which are characterized by relatively lower tensile and yield strength, by lower work-hardening properties, and by the ease with which the material can be brazed. The term "metal" as used herein is intended to include metal alloys as well as elemental metal as will be understood. In a preferred embodiment of this invention, one or more elongated strips of this laminate material are wound parallel to the longitudinal axes of the strips to form single-walled or double-walled tubings, and portions of the laminates are soldered, brazed or welded together to secure the laminates in such tubular shapes. In these configurations, the laminate materials used are formed in large part of easily formed materials such as low-carbon steel and the laminates are therefore characterized by low cost and easy formability. The outer layers of the laminate material embody low-carbon steel so that the laminate is easily brazed and the outer layers protect the inner, corrosion-resistant layer of the laminate against abrasions and the like so that only a thin inner layer of the corrosion-resistant material is required. Because the inner layer of the laminate is thin and is centrally disposed, this inner layer does not add significantly to the cost of the material and has little affect in reducing the formability of the laminate below the formability of the material used in the outer layers of the laminate material. As a result, the laminate is readily formed into tubings of various types, particularly brake tubing, with existing industry facilities and is readily brazed to form such tubings in a conventional manner. However, the inner layer of the laminate, having greater strength and corrosion-resistance properties, provides the tubing with significantly greater strength, particularly strength against bursting, and provides the tubing with substantially greater resistance to corrosion, particularly pitting types of corrosion. The central disposition of the corrosion-resistant material in the laminate minimizes any bimetal effects which might otherwise tend to cause splitting of the tubing. In some alternate embodiments of this invention, the laminate is provided with an additional outer cladding of solder or brazing material metallurgically bonded thereto for facilitating soldering or brazing of the laminate in forming brake tubings and the like.

Other objects, advantages and details of the laminates and tubings of this invention appear in the following detailed description of preferred embodiments of the invention, the detailed description referring to the drawings in which:

FIG. 1 is a perspective view of the laminate material of this invention;

FIG. 2 is a perspective view of an alternate embodiment of the laminate material of this invention;

FIG. 3 is a perspective view of another alternate embodiment of the laminate material of this invention;

FIG. 4 is a section view through a brake tubing of conventional construction known in the prior art;

Figure 5:
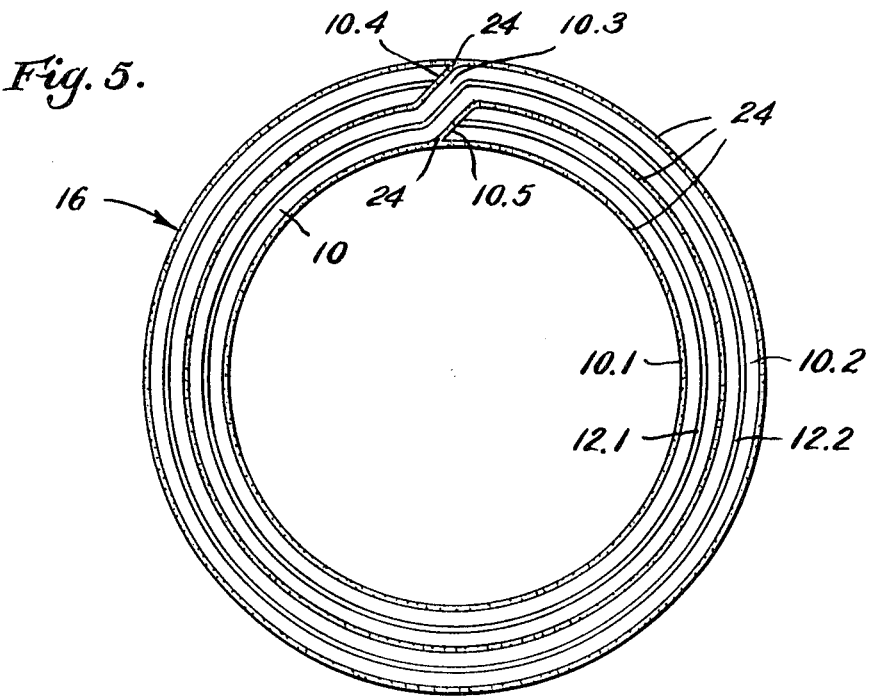
FIG. 5 is a section view similar to FIG. 4 illustrating a brake tubing according to this invention.

Referring to the drawings, 10 in FIG. 1 illustrates the novel and improved composite material or metal laminate of this invention which is shown to include a thin, inner layer 12 of metal of selected tensile strength, yield strength, malleability, ductility, elongation, and work-hardening properties, this inner layer being further characterized by selected high resistance to corrosion. In a preferred embodiment of this invention, the layer 12 comprises stainless steel of any conventional type. For example, in a metal laminate to be used in forming an improved automotive brake tubing material, the inner layer 12 comprises 301 Stainless Steel having the following composition:

|  | % By Weight |
|---|---|
| Chromium | 16–18% |
| Nickel | 6–8% |
| Silicon | 1% max. |
| Manganese | 2% max. |
| Carbon | 0.15% max. |
| Phosphorous | 0.045% max. |
| Sulfur | 0.03% max. |
| Iron | Balance |

This material has a tensile strength of 13,000 p.s.i., a yield strength of 50,000 p.s.i. and an elongation of approximately 65 percent when in annealed condition. The material is easily worked in annealed condition but work-hardens at a rapid rate, the yield strength of the material increasing to approximately 240,000 p.s.i. in response to sufficient cold-working. It should be understood, however, that other types of stainless steel, nickel and nickel-base alloys, cupro-nickel alloys and the like can also be utilized in the inner layer 12 within the scope of this invention.

Alternately, in a preferred laminate 10 for use in automotive brake tubing, the inner layer 12 is formed of 304 Stainless Steel having the following composition:

|  | % By Weight |
| --- | --- |
| Chromium | 18-20% |
| Nickel | 8-12% |
| Silicon | 1% max. |
| Manganese | 2% max. |
| Carbon | 0.04% max. |
| Phosphorous | 0.045% max. |
| Sulfur | 0.03% max. |
| Iron | Balance |

In accordance with the invention, the laminate 10 further includes outer metal layers 14 and 14' which sandwich the inner layer 12 therebetween and which are metallurgically bonded, preferably directly, to respective opposite side surfaces of the inner layer 12 of the laminate. The material in these outer is preferably of relatively lower tensile and yield strength and has less tendency to work-harden than the inner layer 12. The selected material is preferably characterized by suitable malleability and ductility and has suitable elongation properties consistent with end use of the laminate material 10 in forming selected products. The outer layer material is also characterized by lower resistance to corrosion than the inner layer 12. In a preferred embodiment of this invention, the outer layers 14 and 14' are formed by mild or low-carbon steel of any conventional type. For example, in a metal laminate to be used in forming an improved automotive brake tubing material, the outer layers of the laminate preferably comprise SAE 1008 low carbon steel having the following composition:

|  | % By Weight |
| --- | --- |
| Carbon | 0.10% max. |
| Manganese | 0.25-0.50% |
| Phosphorous | 0.040% max. |
| Sulfur | 0.050% max. |
| Silicon | 0.10% max. |
| Iron | Balance |

This material has a tensile strength of 50,000 p.s.i., a yield strength of 37,000 p.s.i. and an elongation of 33 percent when in annealed condition. However, this material work-hardens at a lower rate than the stainless steel previously described and increases in yield strength to approximately 100,000 p.s.i. in response to sufficient cold-working. It should be understood, however, that other mild or low carbon steels such as SAE 1000–1010 steels as well as various other relatively malleable and ductile materials can be utilized in the outer layers 14 and 14' of the laminate 10 within the scope of this invention.

The layers 14 and 14' of the laminate 10 are preferably bonded directly to the inner layer 12 of the laminate by roll bonding methods described in U.S. Pat. No. 2,691,815 or U.S. Pat. No. 2,753,623 wherein the initial bonding of the metal layers by rolling reduction is followed by sintering to improve the bond between the layers, the sintering process further serving to anneal component layers of the laminate. However, any conventional methods can be used in metallurgically bonding the laminate layers together within the scope of this invention. Preferably, however, the laminate is annealed either in the bonding process or thereafter before being used in forming selected metal products.

In preferred embodiments of this invention, the inner layer 12 of the laminate 10 comprises from about 2 percent to about 25 percent of the total thickness of the composite material. For example, where the laminate is to be used in forming automotive brake tubing, the total thickness of the composite material is desirably on the order of about 0.0145 inch or less with the inner layer 12 formed of 304 Stainless Steel comprising about 10 percent of the total thickness of the composite, the outer layers of the laminate being formed of equal thicknesses of SAE 1008 low carbon steel.

In a preferred application of the improved metal laminate 10, a strip of the laminate is used to form a brazed double-wall automotive brake tubing 16 as is illustrated in FIG. 5. In this regard, reference is made to FIG. 4 which illustrates a conventional brake tubing 18 of conventional brazed double-wall construction formed from a monolithic metal strip 20 in a manner well known in the tubing industry. In forming this tubing construction, the strip of metal 20, preferably embodying a low carbon steel, is initially provided with a copper plating or the like on all surfaces thereof and is then slit at its edges to form a strip of the desired width having its edges free of the plating. This plating is usually applied electrolytically to a thickness on the order of about 200 millionths of an inch. This strip is then wound into tubular shape as illustrated in FIG. 4 in which two convolutions 20.1 and 20.2 of the strip are disposed concentrically, the convolutions being connected by an integral, angularly disposed crossover portion 20.3 of the strip against the opposite sides of which the respective edges 20.4 and 20.5 of the strip are juxtaposed. Desirably, the edges of the strip 20 are ground or rolled to form bevels thereon to facilitate their juxtaposition to the crossover portion 20.3 of the strip. The strip formed in this manner is then heated to melt the copper plating thereon for brazing the convolutions 20.1 and 20.2 to each other and for brazing the edges 20.4 and 20.5 of the strip to the crossover portion 20.3 of the strip as illustrated at 21 in FIG. 4. Usually this brazed tubular construction is subjected to drawing for facilitating the described brazing. The copper material 21 which is plated onto the outer surfaces of the convolutions 20.1 and 20.2 of the resulting tubing may be partially removed from the strip material during this brazing process either by stripping or flowing from the strip surface or may be left on the tubing as illustrated in FIG. 3 to form a tube liner and a tube cladding. In this way, the conventional tubing 18 is easily and economically formed using existing facilities adapted for mass production of such tubing. As the manner in which the conventional tubing is made is well known, the process for manufacturing the tubing, and the equipment to be utilized in such manufacture, are not further described herein.

In accordance with this invention, the metal laminate 10 above-described is similarly provided with a plating of copper or other solder or brazing material and is edge slit, and preferably beveled, to the appropriate width in the conventional manner. This strip of the laminate 10 is then formed into tubular shape and is heated in substantially the same manner as described with reference to FIG. 4, thereby forming the tube 16 illustrated in FIG. 5. That is, as illustrated in FIG. 5, the laminate material 10 is formed into two concentric convolutions 10.1 and 10.2 which are connected by an integral, angularly disposed crossover portion 10.3 of the strip, the laminate being then heated for brazing the convolutions to each other and for brazing the edges 10.4 and 10.5 of the strip to respective opposite sides of the crossover portion 10.3 of the strip by means of the copper material 24 or the like originally plated on the laminate. As can be seen, the copper-brazed double-wall tubing 16 provided by this invention includes two concentric convolutions, indicated at 12.1 and 12.2 in FIG. 5, formed by the inner layer 12 of the laminate 10, these corrosion-resistant layers of the tubing providing the tubing itself with high corrosion-resistance properties, particularly with respect to pitting type corrosion. That is, where the inner or outer surface of the tubing is subjected to corrosive conditions, incipient corrosion can only proceed a short distance into the wall of the tubing through one layer 14 or 14.1 of the original laminate before encountering one of the convolutions of the corrosion-resistant layer 12 of the laminate used in the tubing. The outer layer of the wall of the tubing material therefore serves as a sacrificial layer to limit the exposure of the corrosion-resistant convolutions of the tubing to the corrosive conditions. As a result, the service life of these corrosion-resistant materials is enhanced even though the corrosion-resistant layers of the tubing are quite thin. The outer layers of the tubing also protect the more corrosion-resistant layers from scratches and abrasions so that only the very thin layers of corrosion-resistant materials are required without risking piercing of these layers. On the other hand, because the corrosion-resistant layer of the laminate 10 is thin and is centrally disposed in the laminate, the laminate is easily formed into tubular shape as shown in FIG. 5 even where the corrosion-resistant layers of the laminate are less ductile or malleable than the other laminate components and even though the corrosion-resistant layers are formed of materials which tend to work-harden at relatively rapid rates. The central disposition of the corrosion-resistant layers also minimizes any bimetal effects which might otherwise cause a tubing made from the laminate to expand or open up with resulting cracking of the tubing. The outer surfaces of the laminate are also easily brazed together without tending to cause any alteration of the corrosion-resistant properties of the inner layer of the tubing materials. In short, the tubing of FIG. 5 achieves all of the advantages of uniformity, easy formability and economy of manufacture of the tubing shown in FIG. 4 while further providing substantially greater corrosion-resistance and strength in the tubing.

Figure 6:
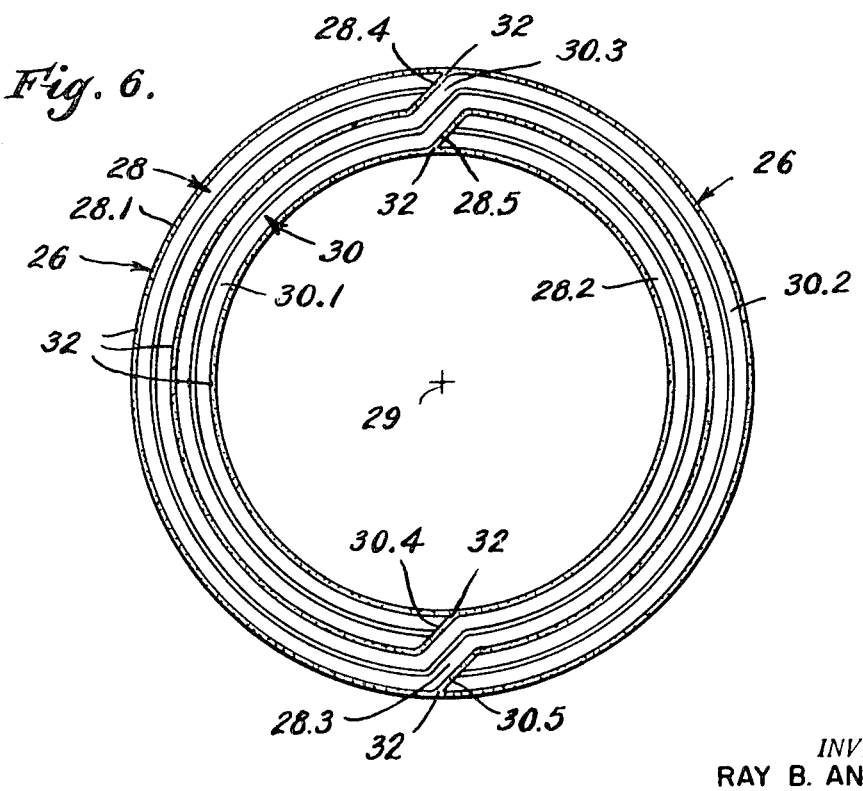
FIG. 6 is a section view similar to FIG. 5 illustrating an alternate embodiment of the brake tubing according to this invention.

As is illustrated in FIG. 6, the laminate material of this invention can also be utilized in forming a brazed double-wall tubing construction 26 embodying two strips 28 and 30 of the laminate material. In forming tubing 26, each of the strips 28 and 30 are formed into two half-convolutions 28.1 to 28.2 and 30.1 to 30.2 which extend around opposite sides of a common center 29 at different radii and which are connected by an integral, angularly disposed crossover portion, 28.3 and 30.3 respectively, in each strip. Each of these formed strips is arranged with its half-convolutions respectively engaged with the respective half-convolutions of the other strip which are of different diameter so that the opposite sides of the crossover portion of each strip are abutted by the edges 28.4–28.5 and 30.4–30.5 of the other laminate strip, the juxtaposed portions of the respective strips being brazed together by means of a brazing material 32 of copper or the like to hold the strips together to form the illustrated tubular construction. In a conventional process, the described tubing configuration is moved through a bath of molten copper or the like to introduce copper between the tubing strips by capillary action for use in brazing the strips together in the manner shown. Preferably, the described tubing configuration is subjected to some drawing during the brazing process for facilitating the brazing. It should be understood that this process for making a brazed double-wall, two-strip tubing construction using monolithic metal strips is well known in the tubing industry and is not therefore further described herein.

It can be seen by reference to FIG. 6 that the tubing 26 has the strength, the brazability, formability and corrosion-resistance properties of the tubing 16 described with reference to FIG. 5 and has advantages over the construction of FIG. 4 for the reasons previously described with reference to FIG. 5. For example, where a tubing is formed with the construction illustrated in FIG. 6 utilizing the laminate material 10 specifically described above as having a total composite thickness of 0.0145 inch and as embodying 301 Stainless Steel and SAE 1008 low carbon steel, the resulting tubing displays a tensile strength of 65,000 p.s.i., and yield strength of 35,000 p.s.i. and an elongation of 21 percent. When a substantial length of the tubing is pressure tested by establishing an internal hydraulic pressure of 5,000 p.s.i., the tube displays no leakage or failure. The tubing is also characterized by excellent corrosion-resistance far superior to that displayed by corresponding tubing formed entirely of SAE 1008 steel.

In another alternate embodiment of this invention shown in FIG. 2, another desirable laminate material 34 is shown to comprise two inner layers 12 of one corrosion-resistant materials such as stainless steel, each of which is sandwiched between and metallurgically bonded to a pair of outer layers 14—14" and 14'—14" respectively of other material such as low carbon steel of relatively lower tensile and yield strength and of relatively lower resistance to corrosion than the layers 12 and 12'. In the laminate 34, each of the layers 12 and 12' is preferably of a thickness comprising from about 2 percent to about 25 percent of the total thickness of the laminate 34 while the layers 14, 14' and 14" are preferably of equal thickness to each other. It will be understood that the laminate 34 can be used in forming tubings of the configurations shown in FIGS. 5 and 6 and can achieve many of the advantages formerly attributed to use of the laminate 10 above-described.

In another alternate embodiment of this invention, shown in FIG. 3, another desirable laminate material 36 is shown to comprise an inner layer 12 of corrosion-resistant material sandwiched between and metallurgically bonded to outer layers 14 and 14' of a material of relatively lower tensile strength, yield strength and corrosion-resistance as previously described with reference to FIG. 1. However, the laminate 36 is further provided with additional outer claddings 38 and 38' of solder or brazing material which is metallurgically bonded in any conventional manner to respective layers 14 or 14' laminate. It will be understood, that laminate 36 can be utilized in forming tubings of the configuration shown in FIGS. 5 and 6 without requiring electrolytic or dip plating of the laminate or tubing configuration with solder or brazing material as was previously described with reference to FIGS. 5 and 6. For example, where the laminate is to be used in forming automotive brake tubing, the layers 38 and 38' of the laminate 36 desirably embody copper or copper brazing alloy having a thickness of the order of from 20–400 millionths of an inch, these layers being preferably roll-bonded to the layers 14 and 14' of the laminate in accordance with the method set forth in one of the patents recited above.

Figure 7:
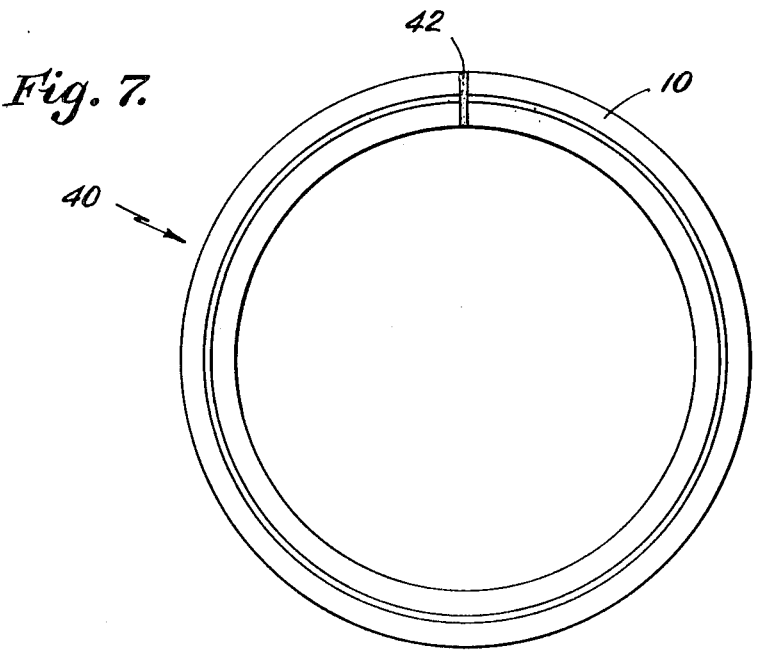
FIG. 7 is a section view similar to FIG. 5 illustrating another alternate embodiment of a tubing according to this invention.
Figure 8:
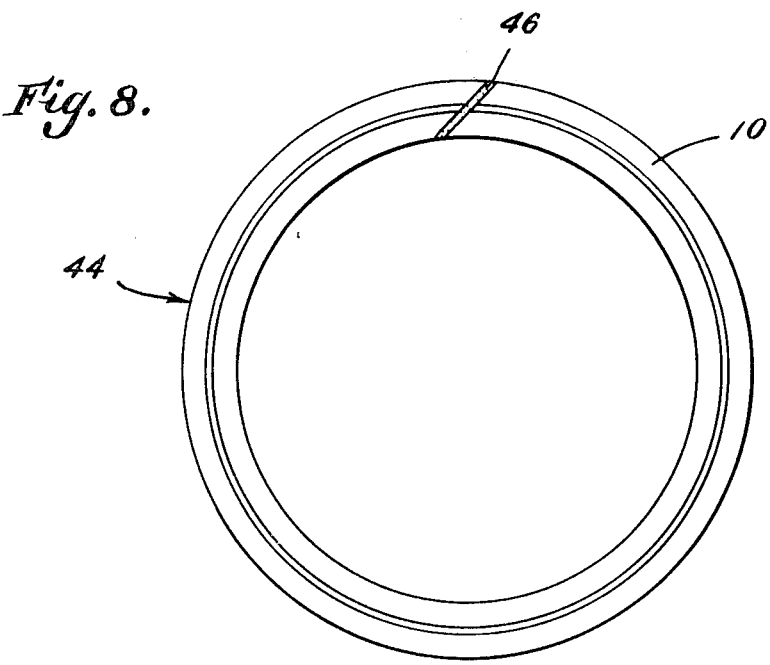
FIG. 8 is a section view similar to FIG. 5 illustrating another alternate embodiment of a tubing according to this invention.

As will be understood, the laminates 10, 34 and 36 of this invention can also be used in forming single-wall tubings, including butt-welded, brazed or soldered tubings and beveledged and welded, brazed or soldered tubings. For example, a strip of the laminate 10 is easily formed into the tubular configuration 40 as shown in FIG. 7 in any conventional manner so that the edges of the strip are butted together and are brazed as indicated at 42. Similarly, a strip of the laminate material is also easily formed into the tubular configuration 44 illustrated in FIG. 8, the edges of the strip being beveled and brazed together as indicated at 46 to form an alternate single-wall tubing construction in any conventional manner.

It should be understood that although particular embodiments of the laminates and tubing materials of this invention have been described by way of illustration, this invention includes all modification and equivalents thereof which fall within the scope of the appended claims.

I claim:

1. A metal tubing comprising at least one elongate strip of metal laminate material formed into a tubular configuration with the longitudinal axis of said tubular configuration substantially parallel with the longitudinal axis of said strip, and a metal-brazing material disposed between portions of said metal laminate material securing said portions together to secure said laminate material in said tubular configuration, each strip of said metal laminate material comprising alternate layers of metal of selected, substantially uniform thickness and of relatively high resistance to corrosion and other layers of metal of relatively greater thickness and relatively lower resistance to corrosion, said laminate material embodying one more of said other metal layers than of said inner metal layers and having each of said inner metal layers sandwiched between a pair of said other metal layers to form a corrosion barrier of said selected thickness between adjacent portions of said other metal layers and having respective opposite sides of said inner metal layers metallurgically bonded to said adjacent portions of said other metal layers.

2. A metal tubing comprising a single elongate strip of a metal laminate material embodying an inner layer of metal of selected, substantially uniform, thickness and of relatively high resistance to corrosion selected from the group consisting of stainless steels, nickel, nickel-base alloys and cupronickel alloys sandwiched between two relatively thicker layers of steel of relatively lower resistance to corrosion selected from the group consisting of low-carbon steels, said inner layer of metal extending between said relatively thicker steel layers forming a corrosion barrier of said selected, substantially uniform, thickness between adjacent portions of said steel layers and having respective opposite side surfaces of said inner metal layer metallurgically bonded to said adjacent portions of said steel layers, said strip of metal laminate material being formed into two convolutions which are concentrically disposed with respect to each other around an axis which is substantially parallel to the longitudinal axis of said elongate strip, said convolutions being connected by an integral crossover portion of said strip material against which the respective edges of said strip are juxtaposed, said convolutions having a metal-brazing material therebetween securing said convolutions to each other, and said strip edges and strip crossover portion having metal-brazing material therebetween securing said strip edges to respective opposite sides of said strip crossover portion.

3. A metal tubing as set forth in claim 2 wherein said inner metal layer of said laminate material is formed of stainless steel.

4. A metal tubing as set forth in claim 3 wherein said inner metal layer of said laminate material is formed of 304 Stainless Steel and said relatively thicker steel layers of said laminate material are formed of 1008 Steel.

5. A metal tubing as set forth in claim 2 wherein said inner metal layer of said laminate material comprises from about 2 percent to 25 percent of the total thickness of said laminate material.

6. A metal tubing as set forth in claim 2 wherein said inner metal layer of said laminate material comprises about 10 percent of the total thickness of said laminate material and said relatively thicker steel layers are of equal thickness with each other.

7. A metal tubing as set forth in claim 2 wherein said metal-brazing material comprises copper.

8. A metal tubing as set forth in claim 2 wherein said tubing has an inner lining and an outer cladding of copper material.

9. A metal tubing comprising a pair of elongate strips of a metal laminate material each embodying an inner layer of metal of selected, substantially uniform, thickness and of relatively high resistance to corrosion selected from the group consisting of stainless steels, nickel, nickel-base alloys and cupronickel alloys sandwiched between two relatively thicker layers of steel of relatively lower resistance to corrosion selected from the group consisting of low carbon steels, said inner layer of metal extending between said relatively thicker steel layers forming a corrosion barrier of said selected, substantially uniform, thickness between adjacent portions of said steel layers and having respective opposite side surfaces of said inner metal layer metallurgically bonded to said adjacent portions of said steel layers, each of said strip of metal laminate material being formed into two half-convolutions which extend around opposite sides of a common axis at different radii and which are connected by an integral crossover portion of said strip material, said common axis being substantially parallel to the longitudinal axis of said strip, each of said formed strips being disposed with its half-convolutions respectively engaged with said respective half-convolutions of the other of said strips which are of different radii and with its edges juxtaposed to respective opposite sides of said crossover portion of the other of said strips, said engaged and juxtaposed portions of said strips having metal brazing material therebetween securing said strips together to define a tubular configuration.

10. A metal tubing as set forth in claim 9 wherein said inner metal layer of each of said strips of laminate material is formed of stainless steel.

11. A metal tubing as set forth in claim 10 wherein said inner metal layer of each of said strips of laminate material is formed of 304 Stainless Steel and said relatively thicker steel layers of each of said strips of laminate material are formed of 1008 Steel.

12. A metal tubing as set forth in claim 9 wherein said inner metal layer of each of said strips of laminate material comprises from about 2 percent to 25 percent of the total thickness of said laminate material.

13. A metal tubing as set forth in claim 9 wherein said inner metal layer of each of said strips of laminate material comprises about 10 percent of the total thickness of said laminate material and said relatively thicker steel layers are of equal thickness with each other.

14. A metal tubing as set forth in claim 9 wherein said metal brazing material comprises copper.

15. A metal tubing as set forth in claim 9 wherein said tubing has an inner lining and an outer cladding of copper material.